United States Patent
Brand

[11] 3,750,712
[45] Aug. 7, 1973

[54] HIGH PRESSURE HOSE

[76] Inventor: Karl Brand, 8603 Ebern, Friedlandstrasse 6, Germany

[22] Filed: Apr. 19, 1971

[21] Appl. No.: 135,136

[30] Foreign Application Priority Data
July 16, 1970 Germany............... P 20 35 399.5

[52] U.S. Cl.............. 138/124, 138/125, 138/126
[51] Int. Cl............................................. F16l 11/16
[58] Field of Search.................. 138/123, 124, 125, 138/126

[56] References Cited
UNITED STATES PATENTS

| | | | |
|---|---|---|---|
| 3,605,818 | 9/1971 | Balchan | 138/126 |
| 3,011,525 | 12/1961 | Randle | 138/126 |
| 1,978,211 | 10/1934 | Longhead | 138/125 |

Primary Examiner—Herbert F. Ross
Attorney—Stevens, Davis, Miller & Mosher

[57] ABSTRACT

A high pressure hose is disclosed having at least two braided layers with a smaller number of strands of threads in the inner braided layer than in the outer braided layer. Thus in making the hose there are a smaller number of spools in the inner braiding head of the braiding apparatus than in the outer braiding head so that the inner head can rotate appreciably faster than the outer head.

7 Claims, 1 Drawing Figure

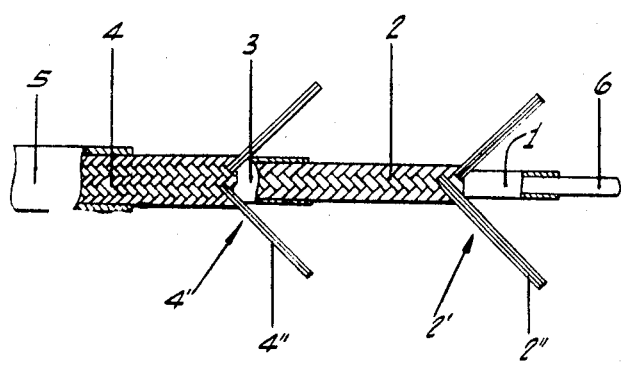

HIGH PRESSURE HOSE

This invention relates to high pressure hose, expecially for hydraulic braking equipment in motor vehicles, comprising a core, a number of braided or woven layers of textile threads, an intermediate layer of elastomeric material between each two adjacent braided layers and an outer covering, each braided layer comprising braided-together strands or strips each formed by a number of individual parallel threads.

In particular such high pressure hoses must be able to withstand the high pressures of the fluid medium contained in them, and if possible they should do this without any expansion in a longitudinal or radial direction, i.e., without a change in their internal volume, and further they should be able to absorb or withstand the vibrations of the vehicle. In order to meet these requirements various different proposals have already been made.

For example, there is known a high pressure hose for carrying an incompressible fluid in a fluid pressure system, which is designed not to dilate appreciably under the pressures arising in the system. This hose comprises a core of a rubber composition or another suitable material, a first layer of braided material, an intermediate layer of rubber composition, a second layer of braided material and a covering of a rubber composition or additional layers of braided material and a rubber composition covering. The angles which the strands in the individual braided layers make with the longitudinal axis of the hose differ from one another and from the angles which would result during manufacture of the hose at the same feeding velocity and the same rotational speed of the spools of the braiding apparatus.

In addition, there is known a high pressure hose of rubber or similar material, expecially for hydraulic braking equipment, in which, to prevent a change in volume when subjected to internal pressure, at least one layer of threads is arranged to extend approximately parallel to the hose axis, the threads being arranged as near as possible to the axis, and further layers of thread are provided which make an included angle of between 45° and 90° with the axis of the hose. Whilst the, or each, layer in which the threads are parallel to the axis serves to take the axial forces, the layers having threads which extend in directions inclined to the axis take the radial forces. For example, such a hose can comprise a core of rubber or similar material, expecially of synthetic plastic material, a layer over it with threads which are parallel to the axis, two superimposed braided layers of which the threads make an angle of between 45° and 90° with the axis of the hose and are impregnated with rubber, and finally a rubber covering. The above mentioned impregnation with rubber achieves the result that the individual layers are securely bonded together during the subsequent vulcanization. Metal threads may also be employed instead of, or in addition to, the textile threads.

A similar known proposal for a high pressure hose which likewise is intended to be distinguished by low changes in volume when subjected to pressure from the fluid medium contained therein, comprises providing a core of a flexible synthetic resin of low elasticity but with a tear resistance capable of withstanding the forces which arise under pressure-loading in the direction of the length of the hose, and providing the core with a braiding which has a braid angle which is greater than 90° to take the radial forces. Preferably the core is made of a polyamide. The braiding can be of textile threads or metal threads.

A further known high pressure hose, especially for hydraulic braking equipment, is provided with a number of layers of reinforcing threads, each layer comprising a number of mutually parallel threads in a helical path wound in the same direction, making an included angle of 52° with the longitudinal axis of the hose, each layer preferably being wound in the opposite direction to the layer below it. It is important that the threads of the inner layer of any two layers have a greater residual extensibility than threads of the layer of the pair, the extensibility of the successive layers being chosen so that they reach their yield point substantially simultaneously. In order to come as close as possible to the stated angle of 52° in each layer, the layers must be of different thicknesses. The layers are coated with an adhesive solution, for example a rubber solution. They can all be made of the same material or alternatively they could be of different materials and could be wound under different tensions. Cotton, linen or a synthetic material of the cellulose class come into consideration as the material for the thread.

In the manufacture of the above-mentioned high presure hoses it is arranged that the layers of thread are wound successively onto an extruded rubber core mounted on a mandrel, after which a rubber outer covering is extruded onto the resulting assembly and then the final vulcanization step is performed.

A further known high pressure hose designed in particular for hydraulic braking equipment comprises a number of braided layers, further intermediate layers, a core and an outer covering of elastomeric material, the thickness of the threads of at least the inner-most woven or braided layer not exceeding 6.5/ single NM or 13/ double NM and the core of the hose having a hardness of at least 80 Shore, and further the individual strands of the woven or braided layers make a braid angle with the longitudinal direction of the hose which is between 50° and 60°. Where there are two braided layers this angle is about 57° to 61° in the inner layer and about 52° to 56° in the outer layer.

In these many proposals of the prior art which aim to take into account the requirements mentioned above, in particular in brake hoses for hydraulic braking equipment, all of the brake hoses having a number of braided layers have the common characteristic that all the braided layers have the same number of strands, i.e. the same number of braided-together strips or strands of thread. In order to allow for the difference in the diameter of the layers, since one must necessarily lie outside another, the outer braided layer is usually manufactured from strips or strands of thrread which each have a greater number of individual threads than the strip or strand of the layer below. For example it is normal in brake hoses having an inner and an outer woven or braided layer for each of the strands of the inner layer to have two threads and for each of the strands of the outer layer to have three or even four threads. The machines for manufacturing such hose have braiding heads which are the same for the inner and outer woven or braided layers, i.e. they each have the same number of thread spools.

The above-mentioned known brake hoses are intended and designed for use in hydraulic braking equipment with drum brakes. They do not meet in sufficient measure the new and stricter safety requirements which take into account that the disc brakes which are now being incorporated operate under substantially higher braking pressures than the drum brakes. These higher loadings require improved hose characteristics to a particular degree.

According to the present invention, in a high pressure hose of the kind mentioned above each strand or strip of the innermost braided layer comprises three or four threads and each strand or strip of the braided layer outside it has two to four threads, the number of strands of the innermost layer being smaller than the number of strands of the layer outside it. The inner braided layer may comprise between about 8 and 20 strands or strips and the outer braided layer between about 12 and 24 strands or strips, the number of strands or strips of the inner braided layer being always smaller than the number of strands or strips of the outer braided layer. For instance, the ratio of the inner strand or strip number to the outer strand or strip number may be 8:12 or 12:24 or 20:24, with other ratios being perfectly feasible.

Preferably the strands of the braided layers make an angle with the longitudinal axis of the hose of between 50° and 60°, the braiding angle of the innermost braided layer being greater than that of the layer which is outside it.

Furthermore, it is advantageous if the innermost braided layer comprises threads of rayon yarn of 153.8 tex (corresponding to 1380 den or NM 6.5) or preferably 122 tex (corresponding to 1100 den or NM 8.2) and the layer which is outside it comprises threads of rayon yarn likewise of 153.8 or 122 tex.

The two said braided layers may be made of threads of the same rayon yarn or alternatively the one layer may be of threads of a different rayon yarn from that employed in the manufacture of the other layer. Alternatively, the braided layers may with equal success consist of or contain threads made of polyester yarn.

In a high pressure hose with two braided layers and with a rubber core and an outer covering of a resilient material resistant to mineral oils, according to a further feature of the present invention the threads of the innermost braided layer are impregnated with a material having an affinity for rubber and the threads of the layer outside it are impregnated with a material which has an affinity for the material of the outer covering. Preferably between each two adjacent braided layers there is provided an elastic intermediate layer of 0.1 to 0.5 millimeters thickness. The intermediate layer can be applied in a dipping process in the case of the minimum thickness and by the rubber shrinking method in the case of the larger thickness. This serves to avoid direct rubbing contact between the adjacent braided layers. The thinner the intermediate layers, the smaller is the dilation of the hose under pressure.

The present invention also has as its object a method of manufacturing hoses having any of the foregoing characteristics, in which the core (which is mounted on a rod-shaped mandrel) is fed through braiding heads arranged in line, each having rotating thread spools, forming an inner and an outer braided layer with the application of an elastic intermediate layer, after which the outer covering is applied and the whole assembly is vulcanized.

According to the invention, the spools from which the threads forming the outer braided layer are drawn rotate around the core at a speed of at least about 25 revolutions per minute, e.g., between about 25 and 50 r.p.m., while the rotational speed of those spools from which the threads forming the inner braided layer are drawn is still higher, e.g., between about 34 and 75 r.p.m.

Preferably, the core is extruded onto the said mandrel and is then enclosed in the braid, the mandrel being forced out after vulcanization, preferably by water under pressure.

This method allows rapid production of the hose. Hitherto it was normal to allow the thread spools of the braiding head forming the inner braided layer to rotate at 25 r.p.m. while the spools of the braiding head for the outer layer rotated at 17 r.p.m. As the hoses according to the present invention have an inner woven or braided layer having fewer strands or strips than the outer braided layers, i.e. fewer thread spools need to be provided on the braiding head for the inner layer, the spools can be arranged on a smaller pitch circle and accordingly can be permitted to rotate faster.

An embodiment of a high pressure hose according to the present invention is described in the following by way of example in conjunction with the accompanying drawing of which the single FIGURE shows a side view of the end portion of a hose mounted on a steel mandrel during manufacture, the whole being shown diagrammatically and the manufacturing machine itself being omitted in the interests of clarity.

The high pressure hose comprises a resilient core 1 made of a rubber composition, an inner braided layer 2 over it, a following resilient intermediate layer 3 of rubber having a thickness between 0.1 and 0.5 millimeters surrounding the inner braided layer, an outer braided layer 4, and an outer covering 5 of mineral-oil-resisting rubber surrounding the outer braided layer.

Each braided layer 2 and 4 is made up of strands or strips 2' and 4' braided together. Each of the strands 2' and 4' is for its part made up of a number of individual threads 2'' and 4'' lying side by side and parallel. The accompanying drawing shows clearly that the outer braided layer 4 is formed from more strands 4' than the number of strands 2' of the inner layer 2. In addition it is clear that in contrast the strands 2' of the inner layer 2 each have more individual threads 2'' in them than the strands 4' have threads 4''. In the example illustrated, the strands 2' of the inner layer 2 are each made up of three threads 2'' whereas the strands 4' on the outer layer 4 each have two threads 4''.

The layers 2 and 4 are impregnated differently. Whereas the inner layer 2 is impregnated with a material which is compatible with rubber or has an affinity for rubber, the outer layer 4 is impregnated with a material which has an affinity for the rubber-like material of the outer covering 5. This provides particularly good adhesion between the individual layers in the hose, in particular between the rubber core 1 and the inner braided layer 2, and between the outer covering 5 of rubber and the outer braided layer 4.

Each of the threads 2'' and 4'' is made of rayon yarn of 122 tex.

The manufacture of the hose illustrated is performed as follows: first the core 1 is extruded, preferably directly onto the mandrel 6, on which it is to be provided with braided layers 2, 4 and the intermediate layer 3 and the outer covering 5. Then, the mandrel 6 is continuously moved through a number of ring-shaped braiding heads of an otherwise conventional braiding apparatus, and the individual braided layers 2, 4 are braided on the core 1 one after another, the head which is furthest from the draw-off device for the finished hose applying the inner layer 2 while a second head applies the outer layer 4. Each braiding head lies perpendicular to the hose that passes through it, and around the central opening for the hose there is arranged that number of thread spools which contains the numer of strands needed for the layer which is to be formed by the head in question, half of these spools rotating in a clockwise sense and the other half in a counterclockwise sense. The spools are arranged two by two in a number of driven cross discs which are mounted to rotate on the braiding head about horizontal axes, the discs being provided with four radial slots mutually displaced by 90°. Each cross disc thus takes simultaneously one spool rotating about the central opening in the head in a clockwise direction and one rotating about this opening in a counter-clockwise direction. In its path around the central opening in the head each spool is handed on from one cross disc to the next and in addition to its circumferential movement about the central opening in the head it performs a radial reciprocating movement so that all the strands of threads coming from the spools are braided together to form a braided layer.

The braiding head for the inner layer 2 has fewer thread spools than the head for the outer layer 4. Moreover the spools of the head for the inner layer 2 are consequently guided to follow a circumferential path of smaller diameter than that of the head for the outer layer 4. Accordingly they can rotate more quickly around the central opening in the head than the spools of the head for the outer layer 4, which rotate at a speed of at least 25 r.p.m.

After the application of the inner braided layer 2 and before the application of the outer layer 4 the resilient intermediate layer having a thickness between 0.1 and 0.5 millimeters is applied. To apply an intermediate layer of small thickness the dipping process is employed, i.e. the layer 2 which has been braided onto the core 1 is allowed to pass through a bath of intermediate layer material. Where intermediate layers 3 are to be applied having thicknesses in the neighborhood of the upper limit of the range given above, then this is done by the shrinking method, the intermediate material layer being wound around the continuously advancing body comprising the mandrel 6, core 1 and braided layer 2.

After the application of the outer braided layer 4 and the outer covering 5, the final vulcanization is performed, and all the layers 1, 2, 3, 4 and 5 of the hose become securely bonded together to form the desired article.

Braiding apparatus suitable for carrying out the process and making the high pressure hose in accordance with the present invention is per se well known and forms no part of the present invention. One such braiding apparatus is disclosed e.g., in the Journal, "The Flying," No. 1, Feb. 1, 1969.

What is claimed is:

1. High pressure hose comprising a core, a number of braided layers of textile threads, an intermediate layer of elastomeric material between each two adjacent braided layers, and an outer covering, each braided layer comprising braided-together strands each formed by a number of individual, parallel threads and each strand of the innermost braided layer comprising three to four threads and each strand of the braided layer outside it comprising two to four threads, the number of strands of the innermost layer being smaller than the number of strands of the layer outside it.

2. High pressure hose according to claim 1 in which the strands of the braided layers make an angle between about 50° and 60° with the longitudinal axis of the hose, the braiding angle of the innermost layer being larger than that of the layer outside it.

3. High pressure hose according to claim 1 in which the innermost braided layer comprises threads of rayon yarn of about 122 tex and the braided layer outside it has threads of rayon yarn likewise of about 122 tex.

4. High pressure hose according to claim 1 in which the threads in the two innermost braided layers are rayon yarn of about 153.8 tex.

5. High pressure hose according to claim 1 in which the braided layers are composed of threads made of polyester yarn.

6. High pressure hose according to claim 1 with two braided layers and with a rubber core and outer covering of a resilient material resistant to mineral oils, in which the threads of the innermost braided layer are impregnated with a material which has an affinity for rubber and the threads of the layer which is outside it are impregnated with a material which has an affinity for the material of the outer covering.

7. High pressure hose according to claim 1 in which between each two adjacent braided layers there is provided an elastic intermediate layer having a thickness between about 0.1 and 0.5 millimeters.

* * * * *